(12) United States Patent
Blanchard et al.

(10) Patent No.: US 7,358,313 B2
(45) Date of Patent: Apr. 15, 2008

(54) THIOURONIUM SALT AS ANTI-REVERSION AGENT IN A VULCANIZABLE RUBBER COMPOSITION AND TIRE BASED ON SUCH A COMPOSITION

(75) Inventors: Christiane Blanchard, Chateaugay (FR); Salvatore Pagano, Gunma-Ken (JP)

(73) Assignee: Michelin Recherche et Technique S.A., Granges-Paccot (CH)

( * ) Notice: Subject to any disclaimer, the term of this patent is extended or adjusted under 35 U.S.C. 154(b) by 369 days.

(21) Appl. No.: 11/009,085

(22) Filed: Dec. 13, 2004

(65) Prior Publication Data

US 2005/0187340 A1 Aug. 25, 2005

Related U.S. Application Data

(63) Continuation of application No. PCT/EP03/06160, filed on Jun. 12, 2003.

(30) Foreign Application Priority Data

Jun. 12, 2002 (FR) .................................. 02 07233

(51) Int. Cl.
  *C08F 36/06* (2006.01)
  *C08F 36/08* (2006.01)
(52) U.S. Cl. ................ 526/335; 525/332.6; 525/332.7
(58) Field of Classification Search ............... 526/335, 526/332.6, 332.7
 See application file for complete search history.

(56) References Cited

U.S. PATENT DOCUMENTS 3,801,531 A * 4/1974 Berejka ..................... 442/151
3,979,369 A * 9/1976 Trivette, Jr. .............. 525/332.7
6,326,438 B1 * 12/2001 D'Sidocky et al. ...... 525/331.1

FOREIGN PATENT DOCUMENTS

EP 0 823 453 A1 2/1998
FR 1 538 328 9/1968
GB 1178242 * 1/1970

OTHER PUBLICATIONS

Search Report issued in International Application No. PCT/EP03/06160.

* cited by examiner

*Primary Examiner*—Ling-Sui Choi
(74) *Attorney, Agent, or Firm*—Buchanan Ingersoll & Rooney PC

(57) ABSTRACT

A rubber composition based on at least (i) an elastomer, (ii) a reinforcing filler and (iii) a thiouronium salt or an analogue of a thiouronium salt of the formula (I) below:

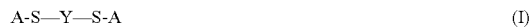

in which,
 A represents a group

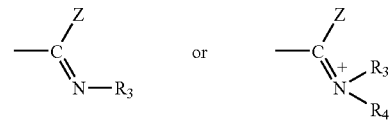

associated respectively with a molecule HX or an ion X—, X denoting a halogen atom and
 Z denoting

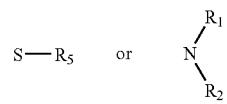

Incorporating the thiouronium salt into the vulcanizable rubber composition makes it possible to substantially reduce the reversion rate of the vulcanized rubber composition.

20 Claims, No Drawings

THIOURONIUM SALT AS ANTI-REVERSION AGENT IN A VULCANIZABLE RUBBER COMPOSITION AND TIRE BASED ON SUCH A COMPOSITION

CROSS-REFERENCE TO RELATED APPLICATIONS

This application is a continuation of PCT Application No. PCT/EP03/06160, filed Jun. 12, 2003, published in French as WO 03/106195, which claims priority of French Application No. 02/07233, filed Jun. 12, 2002, the disclosures of both applications being incorporated herein in their entirety.

BACKGROUND OF THE INVENTION

The invention relates to vulcanizable elastomer compositions and in particular to vulcanizable diene rubber compositions intended for tire production. More particularly, the invention concerns novel anti-reversion agents capable of being used in such compositions.

The vulcanization of unsaturated elastomers in the presence of sulphur or sulphur donors results in a change into the elastic state of the elastomer mixture which is accompanied by modification of the mechanical properties of the mixture. This vulcanization proceeds during curing of the mixture by the formation of a network of sulphur bridges between the different polymer molecules.

The network formed in this manner nevertheless suffers from thermal instability. Heating of the tires during travel generates thermal stresses in the cured elastomer mixtures constituting the network. These thermal stresses have an overcuring effect which, when the temperature of the mixture reaches a value approaching the vulcanization temperature, brings about the phenomenon of reversion. Reversion is a breakdown of the elastomer network due to the destruction or shortening of the polysulphurized crosslinking bridges. This breakdown of the network results in a drop in modulus and unfavorably modifies the mechanical properties of the elastomer mixture.

An attempt has accordingly been made to limit or even eliminate this phenomenon of reversion by adding to the rubber compositions specific additives known as anti-reversion agents which make it possible to stabilise the vulcanized rubber compositions thermally.

Bismaleimides constitute one commonly described family of anti-reversion agents. Used alone, these compounds are in particular illustrated in the document JP91/056544. Combinations of bismaleimides and other compounds, such as other anti-reversion agents or vulcanization accelerators, are in particular the subject matter of documents EP 0 191 931, U.S. Pat. Nos. 5,328,636, 5,616,279, 5,736,611 or alternatively EP 0 823 453.

Bis-citraconimides have also been described in anti-reversion agent applications, alone or in combination with other additives, in particular in documents WO 92/07904, U.S. Pat. No. 5,623,007 and U.S. Pat. No. 5,872,188. Bis-citraconic acid and the derivatives thereof are also mentioned as an agent which improves reversion resistance, in particular in document U.S. Pat. No. 5,696,188.

Bis-succinimides constitute another class of anti-reversion agents and the derivatives thereof, which are described in particular in documents U.S. Pat. No. 5,844,049 and WO 96/20246.

Document JP 94/256573 describes the use of dithiocarbamate salts for improving reversion resistance. Document EP 0 832 920 discloses the use of zinc dithiophosphate for improving the thermal stabilisation of vulcanized rubber compositions. Document U.S. Pat. No. 4,417,012 describes poly-thiosulphate or poly-thiosulphonate compounds which also make it possible to stabilise vulcanized rubber compositions thermally against the phenomenon of reversion. More recently, U.S. Pat. No. 5,736,611 teaches improvement of the reversion resistance of a rubber composition comprising polyacrylates.

Anti-reversion agents are a major focus of research, particularly in the field of tires, where optimum thermal stability is fundamental. Tires cannot in fact withstand substantial modification of their mechanical properties without such modification impairing their performance.

SUMMARY OF THE INVENTION

Novel anti-reversion agents which are usable in particular in tire applications and permit sufficient and satisfactory thermal stabilisation of the vulcanized rubber compositions are thus constantly being sought. The object of the present invention is accordingly to propose novel anti-reversion agents usable in elastomer compositions which are more particularly suited to tire production.

The inventors have now surprisingly discovered that certain thiouronium salts or analogues of these salts have a remarkable anti-reversion capability and impart to the elastomer compositions containing them an advantageous thermal stability, in particular for use in tire production. Furthermore, these salts do not require the presence of a coagent in order to achieve a significant reduction in the level of reversion of the vulcanized rubber compositions.

Consequently, the present invention firstly provides a vulcanizable rubber composition comprising at least (i) a diene elastomer, (ii) a reinforcing filler and (iii) a thiouronium salt or an analogue of this salt of the formula (I):

$$\text{A-S—Y—S-A} \tag{I}$$

in which
-A represent a group

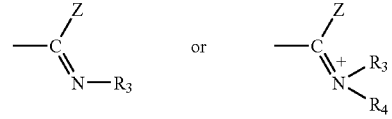

associated respectively with a molecule HX or an ion X—,
X denoting a halogen atom and
Z denoting

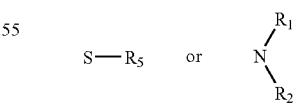

in which the radicals $R_1$, $R_2$, $R_3$, $R_4$ and $R_5$, which may be identical or different, denote a hydrogen atom or a linear or branched, monovalent hydrocarbon group selected from among $C_1$-$C_6$ alkyl, $C_2$-$C_8$ alkenyl, $C_5$-$C_8$ cycloalkyl, aryl or aralkyl groups, the alkyl radical being $C_1$-$C_6$, or alternatively $R_2$ and $R_3$ or $R_5$ and $R_3$ form with the nitrogen atoms to which they are linked an unsaturated heterocycle having from 3 to 5 carbon atoms, substituted or unsubstituted by one or more $C_1$-$C_6$ alkyl radicals, said heterocycle being conjugated or unconjugated with a benzene nucleus, and $R_1$ and $R_4$ denote hydrogen, $C_1$-$C_6$ alkyl or $C_2$-$C_8$ alkenyl;

Y represents a divalent hydrocarbon group selected from among an alkylene radical having 1 to 20 carbon atoms, a cycloalkylene radical having 6 to 24 carbon atoms, an arylene radical having 6 to 18 carbon atoms, an aralkylene radical having 7 to 25 carbon atoms, the alkylene radicals being linear or branched and optionally interrupted by one or more heteroatoms selected from among O and N.

A thiouronium salt is taken to mean the product of the reaction of a substituted or unsubstituted thiourea with a hydrocarbon halide.

An analogue of a thiouronium salt according to the present invention is taken to mean a compound of the formula (I) in which Z denotes S—$R_5$ with $R_3$, $R_4$ and $R_5$ being as defined above, or alternatively, Z denotes

with $R_2$ and $R_3$ forming with the nitrogen atoms to which they are linked an unsaturated heterocycle having from 3 to 5 carbon atoms and substituted or unsubstituted by one or more $C_1$-$C_6$ alkyl radicals, said heterocycle being conjugated or unconjugated with a benzene nucleus, and $R_1$ and $R_4$ denote hydrogen, $C_1$-$C_6$ alkyl or $C_2$-$C_8$ alkenyl, Y being as defined above.

DETAILED DESCRIPTION OF THE INVENTION

Thiouronium salts are commonly described in the literature. In the field of organic chemistry, they are in particular reaction intermediates in the synthesis of mercaptans (G. G. Urquart, J. W. Gates, R. Connor, Org. Synth., Collect. vol. 3, p. 363, 1954 or Fieser&Fieser, Reagents for organic synthesis, vol. 1, 1164).

The literature also makes reference to the use of thiouronium salts in very diverse applications such as in textile applications (S. M. Burkinshaw, X. P. Lei, JSDC, vol. 106, 307, 1990) for example for increasing the "colorability" of cotton, in industrial applications (FR 2,331,555, ANIC S.P.A.) as a heavy metal scavenger or alternatively acting on the corrosion of steel in an acidic medium (J. Electrochem. Soc. India (1995), 44 (2), 121-8), photographic applications in particular as a nucleating agent (U.S. Pat. No. 5,439,776, Sun Chemical Corp.) or alternatively therapeutic applications (FR 1,538,328, The Wellcome Foundation), in particular as antimicrobial agents (Farmaco (1989), 44 (12), 1129-40) or protection agents against certain types of radiation (J. Nucl. Med (1995), 36(2), 259-66; Res. Commun. Chem. Pathol. Pharmacol. (1985), 49(1), 47-56), together with various other applications, in particular due to the biological activity of certain thiouronium salts.

The thermal stabilization of rubber compositions by no means other than the addition of these thiouronium salts or their analogues, and their capability of significantly reducing reversion are surprising and unexpected in the light of the prior art.

Consequently, the present invention also provides the use of a thiouronium salt or an analogue of said salt, as defined above, as an anti-reversion agent in a vulcanizable rubber composition.

The present invention also provides the use of a rubber composition according to the invention for the manufacture of thermally stabilized rubber articles, in particular tires or semi-finished rubber products intended for these tires, said semi-finished products being selected in particular from among the group consisting of treads, underlayers intended, for example, to be placed under said treads, crown reinforcement plies, sidewalls, carcass reinforcement plies, beads, protectors, inner tubes and airtight internal rubbers for tubeless tires.

The present invention furthermore provides these tires and semi-finished products themselves when they comprise an elastomer composition according to the invention, said tires of the invention being intended to be fitted on, for example, passenger vehicles, 4×4 vehicles (with 4 driving wheels), SUV ("Sport Utility Vehicles"), two-wheeled vehicles (in particular bicycles or motorcycles), industrial vehicles such as vans, "heavy vehicles", i.e. subway trains, buses, road transport machinery (trucks, tractors, trailers), off-road vehicles, agricultural machinery or construction machinery, aircraft or other transport or handling vehicles.

The invention also relates to a process for the preparation of a vulcanizable rubber composition, in particular usable for the manufacture of tires, comprising the following steps:

a) at least one reinforcing filler is incorporated, in a mixer, into an elastomer;

b) this is all thermomechanically kneaded once or more until a maximum temperature of between 110° C. and 190° C. is reached;

c) the mixture is cooled;

d) a vulcanization system comprising sulphur is then incorporated;

e) this is all kneaded up to a maximum temperature of less than 120° C., and characterized in that at least one thiouronium salt or an analogue of a thiouronium salt as defined above is incorporated in at least one of steps a) and d).

The present invention also provides a process for reducing the reversion rate of a vulcanized rubber composition, this process being characterized by the incorporation into this composition in the uncured state of at least one thiouronium salt as defined above by thermomechanical kneading.

The invention and the advantages thereof will readily be understood in the light of the following description and examples of embodiment, which in no way limit the scope of the invention.

The invention will be more particularly described in relation to an application to tires. Nevertheless, the invention is not limited to such an application. Indeed, the compositions according to the invention are also appropriate for the production of rubber articles other than semi-finished articles for tires which are also subjected to thermal stresses and which require improved thermal stability in order to prevent degradation of their mechanical properties.

I. PERFORMANCE OF THE INVENTION

The rubber compositions according to the invention are based on at least each of the following constituents: (i) at least one diene elastomer, (ii) at least one reinforcing filler and (iii) at least one specific thiouronium salt as anti-reversion agent.

When the reinforcing filler consists entirely or in part of an inorganic or white filler, it is associated, in the rubber compositions according to the invention, with a coupling agent.

Of course, the phrase "composition based on" is to be understood to mean a composition comprising the various constituents and/or the composition arising from the in situ reaction of these various constituents, certain of these constituents being capable of reacting, or intended to react with one another, at least in part, during the various phases of manufacture of the composition, in particular during the vulcanization thereof.

I.1 Elastomer:

"Diene" elastomer or rubber is understood to mean, in known manner, an elastomer arising at least in part (i.e. a homopolymer or a copolymer) from diene monomers (monomers bearing two double carbon-carbon bonds, whether conjugated or not).

These diene elastomers may be divided into two categories: "essentially unsaturated" or "essentially saturated".

In general, "essentially unsaturated" is understood to mean a diene elastomer resulting at least in part from conjugated diene monomers having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, a "highly unsaturated" diene elastomer is understood to mean in particular a diene elastomer having a content of units of diene origin (conjugated dienes) which is greater than 50%.

These definitions being given, a diene elastomer capable of being used in the compositions according to the invention is in particular taken to be:

(a)—any homopolymer obtained by polymerisation of a conjugated diene monomer having 4 to 12 carbon atoms;

(b)—any copolymer obtained by copolymerization of one or more dienes conjugated together or with one or more vinyl aromatic compounds having 8 to 20 carbon atoms;

(c)—a ternary copolymer obtained by copolymerization of ethylene, of an α-olefin having 3 to 6 carbon atoms with an unconjugated diene monomer having 6 to 12 carbon atoms, such as, for example, the elastomers obtained from ethylene, from propylene with an unconjugated diene monomer of the aforementioned type, such as in particular 1,4-hexadiene, ethylidene norbornene or dicyclopentadiene;

(d)—a copolymer of isobutene and isoprene (butyl rubber), together with halogenated, in particular chlorinated or brominated, versions of this type of copolymer.

Although it applies to any type of diene elastomer, the person skilled in the art of tires will understand that the present invention is used first and foremost with essentially unsaturated diene elastomers, in particular those of type (a) or (b) above and more particularly with isoprene elastomers, in particular with natural rubber (NR).

Suitable conjugated dienes are, in particular, 1,3-butadiene, 2-methyl-1,3-butadiene, 2,3-di($C_1$ to $C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomizing agent and the quantities of modifying and/or randomizing agent used. The elastomers may for example be block, random, sequenced or microsequenced elastomers, and may be prepared in a dispersion or in solution; they may be coupled and/or starred or alternatively functionalized with a coupling and/or starring or functionalizing agent.

Suitable elastomers are polybutadienes and in particular those having a content of 1,2-units between 4% and 80%, or those having a cis-1,4 content of more than 80%, polyisoprenes, butadiene-styrene copolymers, and in particular those having a styrene content of between 5% and 50% by weight and, more particularly, between 20% and 40%, a content of 1,2-bonds of the butadiene moiety of between 4% and 65%, and a content of trans-1,4 bonds of between 20% and 80%, butadiene-isoprene copolymers and in particular those having an isoprene content of between 5% and 90% by weight and a glass transition temperature (Tg, measured in accordance with ASTM Standard D3418-82) of between −40° C. and −80° C., isoprene-styrene copolymers and in particular those having a styrene content of between 5% and 50% by weight and a Tg of between −25° C. and −50° C. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene moiety of between 4% and 85%, a content of trans-1,4 units of the butadiene moiety of between 6% and 80%, a content of 1,2-plus 3,4-units of the isoprene moiety of between 5% and 70%, and a content of trans-1,4 units of the isoprene moiety of between 10% and 50%, and more generally any butadiene-styrene-isoprene copolymer having a Tg of between −20° C. and −70° C.

In summary, the diene elastomer of the composition according to the invention may be selected from the group of highly unsaturated diene elastomers comprising polybutadienes (BR), polyisoprenes (IR), natural rubber (NR), butadiene copolymers, isoprene-styrene copolymers and mixtures of these elastomers. Such copolymers are more preferably selected from among the group consisting of butadiene-styrene copolymers (SBR), isoprene-butadiene copolymers (BIR), isoprene-styrene copolymers (SIR) and isoprene-butadiene-styrene copolymers (SBIR).

In the case of a passenger car tire, the diene elastomer is for example an SBR, which may comprise an SBR prepared in emulsion ("ESBR") or an SBR prepared in solution ("SSBR"), or an SBR/BR, SBR/NR (or SBR/IR), or alternatively BR/NR (or BR/IR) blend (mixture). In the case of an SBR elastomer, the SBR used in particular has a styrene content of between 20% and 30% by weight, a content of vinyl bonds of the butadiene moiety of between 15% and 65%, a content of trans-1,4 bonds of between 15% and 75% and a Tg of between −20° C. and −55° C. Such an SBR copolymer, preferably prepared in solution (SSBR), is optionally used in a mixture with a polybutadiene (BR) preferably having more than 90% cis-1,4 bonds.

In the case of a tire for a utility vehicle, in particular for a heavy vehicle, the diene elastomer is in particular an isoprene elastomer; "isoprene elastomer" is understood to mean, in known manner, an isoprene homopolymer or copolymer, in other words a diene elastomer selected from the group consisting of natural rubber (NR), synthetic polyisoprenes (IR), the various copolymers of isoprene and mixtures of these elastomers. Of the isoprene copolymers, mention will be made in particular of isobutene-isoprene copolymers (butyl rubber—IIR), isoprene-styrene copolymers (SIR), isoprene-butadiene copolymers (BIR) or isoprene-butadiene-styrene copolymers (SBIR). This isoprene elastomer is preferably natural rubber or a synthetic cis-1,4 polyisoprene; of these synthetic polyisoprenes, those polyisoprenes having a content (mol %) of cis-1,4 bonds greater than 90%, more preferably still greater than 98%, are preferably used. For such a tire for a utility vehicle, the diene elastomer may consist entirely or in part of another highly unsaturated elastomer such as, for example, an SBR elastomer.

According to another embodiment of the invention, in particular when it is intended for a tire sidewall, the composition according to the invention may contain at least one essentially saturated diene elastomer, in particular at least one EPDM copolymer, whether this copolymer is or is not used, for example, in a mixture with one or more of the highly unsaturated diene elastomers mentioned above.

According to still another embodiment of the invention, in particular when it is intended for an internal tire rubber or any other airtight member, the composition according to the invention may contain at least one essentially saturated diene elastomer of the isobutene-isoprene copolymer (butyl rubber) type, together with the halogenated versions of these copolymers.

The compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers. More particularly, the compositions according to the invention contain as the diene elastomer at least one isoprene elastomer, in particular natural rubber, alone or as a mixture, in a majority proportion or not, with at least one other diene elastomer.

I.1 Reinforcing Filler

The reinforcing filler used for the purposes of the present invention may consist of an inorganic or white filler or of an organic filler, for example carbon black, or of a mixture of these two types of filler.

Preferably, in the rubber compositions according to the invention, the inorganic reinforcing filler constitutes the majority, i.e. more than 50% by weight, of the total reinforcing filler, more preferably more than 80% by weight of this total reinforcing filler.

In the present application, "inorganic reinforcing filler" is understood to mean in known manner an inorganic or mineral filler, whatever its color and its origin (natural or synthetic), also referred to as "white" filler or sometimes "clear" filler in contrast to carbon black, this inorganic filler being capable, on its own, without any means other than an intermediate coupling agent, of reinforcing a rubber composition intended for the manufacture of tires, in other words which is capable of replacing a conventional tire-grade carbon black filler in its reinforcement function.

Preferably, the inorganic reinforcing filler is a mineral filler of the silica ($SiO_2$) or alumina ($Al_2O_3$) type, or a mixture of these two fillers.

The silica used may be any reinforcing silica known to the person skilled in the art, in particular any precipitated or pyrogenic silica having a BET surface area and a specific CTAB surface area which are both less than 450 $m^2/g$, preferably from 30 to 400 $m^2/g$. Highly dispersible precipitated silicas (referred to as "HDS") are preferred, in particular when the invention is used for the manufacture of tires having a low rolling resistance; "highly dispersible silica" is understood in known manner to mean any silica having a substantial ability to disagglomerate and to disperse in an elastomer matrix, which can be observed in known manner by electron or optical microscopy on thin sections. As non-limiting examples of such preferred highly dispersible silicas, mention may be made of silica Perkasil KS 430 from Akzo, silica BV3380 from Degussa, silicas Zeosil 1165 MP and 1115 MP from Rhodia, silica Hi-Sil 2000 from PPG, silicas Zeopol 8741 or 8745 from Huber, and treated precipitated silicas such as, for example, the aluminium-"doped" silicas described in application EP-A-0 735 088.

The reinforcing alumina preferably used is a highly dispersible alumina having a BET surface area from 30 to 400 $m^2/g$, more preferably between 60 and 250 $m^2/g$, and an average particle size at most equal to 500 nm, more preferably at most equal to 200 nm, as described in the aforementioned application EP-A-0 810 258. Non-limiting examples of such reinforcing aluminas which may be mentioned are in particular aluminas A125, CR125, D65CR from Baïkowski.

The physical state in which the inorganic reinforcing filler is present is immaterial, whether it be in the form of a powder, microbeads, granules or alternatively balls. Of course, "inorganic reinforcing filler" is also understood to mean mixtures of different inorganic reinforcing fillers, in particular of highly dispersible silicas and/or aluminas such as described above.

When the rubber compositions of the invention are used as treads for tires, the inorganic reinforcing filler used, in particular if it is silica, preferably has a BET surface area of between 60 and 250 $m^2/g$, more preferably between 80 and 200 $m^2/g$.

The inorganic reinforcing filler may also be used in a blend (mixture) with carbon black. Suitable carbon blacks are any carbon blacks, in particular blacks of the type HAF, ISAF or SAF, which are conventionally used in tires, and particularly in treads for tires. Non-limiting examples of such blacks which may be mentioned are the blacks N115, N134, N234, N339, N347 and N375.

The amount of carbon black present in the total reinforcing filler may vary within wide limits, this amount of carbon black preferably being less than the amount of inorganic reinforcing filler present in the rubber composition.

In the compositions according to the invention, in particular in the treads incorporating such compositions, it is preferred to use a small proportion of a carbon black in association with the inorganic reinforcing filler, in a preferred amount of between 2 and 20 phr, more preferably within a range from 5 to 15 phr. Within the ranges indicated, a benefit is obtained from the coloring properties (black pigmentation agent) and anti-UV properties of the carbon blacks, without furthermore adversely affecting the typical performance provided by the inorganic reinforcing filler, namely low hysteresis (reduced rolling resistance) and high grip whether on wet, snow-covered or icy ground.

Preferably, the total reinforcing filler content (inorganic reinforcing filler plus carbon black if applicable) is between 10 and 200 phr, more preferably between 20 and 150 phr, the optimum differing according to the intended applications; in fact, the level of reinforcement expected of a bicycle tire, for example, is in known manner distinctly lower than that required for a tire capable of travelling at a sustained high speed, for example a motorcycle tire, a passenger vehicle tire or a tire for a utility vehicle such as a heavy vehicle.

For treads for tires which are liable to travel at high speed, the quantity of inorganic reinforcing filler, in particular if it is silica, is preferably between 30 and 140 phr, more preferably between 50 and 120 phr.

Finally, the person skilled in the art will understand that an organic reinforcing filler could be used as an equivalent filler to the inorganic reinforcing filler described in the present paragraph, said organic reinforcing filler in particular comprising a carbon black covered at least in part with an inorganic layer, for example of silica, and requiring the use of a coupling agent to establish the bond with the elastomer.

I.3 Coupling Agent

When the reinforcing filler consists entirely or in part of an inorganic or white filler, the rubber composition also comprises a coupling agent.

It will be recalled that (inorganic filler/elastomer) "coupling agent" should, in known manner, be taken to mean an agent capable of establishing a sufficient chemical and/or physical bond between the inorganic filler and the diene elastomer; such a coupling agent, which is at least difunctional, has, for example, the simplified general formula "Y'-T-X'", in which:

Y' represents a functional group ("Y'" function) which is capable of bonding physically and/or chemically with the inorganic filler, it being possible to create such a bond, for example, between a silicon atom of the coupling agent and the surface hydroxyl (OH) groups of the inorganic filler (for example, surface silanols in the case of silica);

X' represents a functional group ("X'" function) which is capable of bonding physically and/or chemically with the diene elastomer, for example by means of a sulphur atom;

T represents divalent organic group capable of linking Y' and X'.

The coupling agents must in particular not be confused with simple agents for covering the inorganic filler which, in known manner, may comprise the "Y'" function, which is active with respect to the inorganic filler, but are devoid of the "X'" function which is active with respect to the diene elastomer. (Silica/diene elastomer) coupling agents, of variable effectiveness, have been described in a very large number of documents and are well known to the person skilled in the art. It is possible to use any known coupling agent capable of providing an effective bond, in the diene rubber compositions usable for the manufacture of tire treads, between an inorganic reinforcing filler such as silica and a diene elastomer, in particular polyfunctional organosilanes or polyorganosiloxanes bearing the above X' and Y' functions.

In particular, polysulphurized silanes, known as "symmetrical" or "asymmetrical" depending on their particular structure, are used, such as described for example in the patents or patent applications FR 2 149 339, FR 2 206 330, U.S. Pat. Nos. 3,842,111, 3,873,489, 3,978,103, 3,997,581, 4,002,594, 4,072,701, 4,129,585, 5,580,919, 5,583,245, 5,650,457, 5,663,358, 5,663,395, 5,663,396, 5,674,932, 5,675,014, 5,684,171, 5,684,172, 5,696,197, 5,708,053, 5,892,085, and EP 1 043 357.

Particularly suitable for implementing the invention, without the definition below constituting a limitation, are symmetrical polysulphurized alkoxysilanes which satisfy the general formula (II) below:

$$Z'\text{-}A'\text{-}S_x\text{-}A'\text{-}Z', \tag{II}$$

in which:
x is an integer from 2 to 8 (preferably from 2 to 5);
A' is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, in particular propylene);
Z' satisfies one of the formulae below:

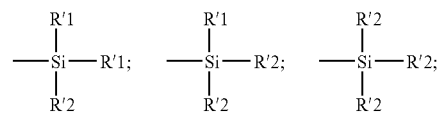

in which:
the radicals R'1, which may or may not be substituted, and may be identical or different, represent a $C_1$-$C_{18}$ alkyl group, a $C_5$-$C_{18}$ cycloalkyl group, or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl).
the radicals R'2, which may or may not be substituted, and may be identical or different, represent a hydroxyl group, a $C_1$-$C_{18}$ alkoxyl group or a $C_5$-$C_{18}$ cycloalkoxyl group (preferably a group selected from among hydroxyl, $C_1$-$C_{18}$ alkoxyl and $C_5$-$C_8$ cycloalkoxyl, still more preferably a group selected from among hydroxyl and $C_1$-$C_4$ alkoxyl, in particular methoxyl and ethoxyl).

In the case of a mixture of polysulphurized silanes corresponding to the formula (I) above, in particular conventional commercially available mixtures, it will be understood that the mean value of "x" is a fractional number, preferably varying between 2 and 5.

Examples of polysulphurized silanes which may more particularly be mentioned are bis(($C_1$-$C_4$)alkoxyl-($C_1$-$C_4$) alkyl-silyl-($C_1$-$C_4$)alkyl) polysulphides (in particular disulphides, trisulphides or tetrasulphides), such as, for example bis(3-trimethoxysilylpropyl) or bis(3-triethoxysilylpropyl) polysulphides. Among these compounds, bis(3-triethoxysilylpropyl) tetrasulphide, abbreviated to TESPT, of the formula $[(C_2H_5O)_3Si(CH_2)_3S_2]_2$ or bis(triethoxysilylpropyl) disulphide, abbreviated to TESPD, of the formula $[(C_2H_5O)_3Si(CH_2)_3S]_2$ are in particular used.

TESPD is sold, for example, by Degussa under the name Si75 (in the form of a mixture of disulphide (75% by weight) and of polysulphides), or alternatively by Witco under the name Silquest A1589. TESPT is sold, for example, by Degussa under the name Si69 (or X50S when supported at a content of 50 wt. % on carbon black) or alternatively by the company Osi Specialties under the name Silquest A1289 (in both cases, a commercial mixture of polysulphides with an average value of n approaching 4).

The person skilled in the art will know how to adjust the content of coupling agent in the compositions of the invention depending on the intended application, the nature of the elastomer used and the quantity and nature of inorganic filler used as reinforcing filler.

The coupling agent used could be grafted beforehand (via the "X'" function) onto the diene elastomer of the composition of the invention, the elastomer functionalized or "precoupled" in this manner then comprising the free "Y'" function for the inorganic reinforcing filler. The coupling agent could also be grafted beforehand (via the "Y'" function) onto the inorganic reinforcing filler, it then being possible to bond the filler "precoupled" in this manner to the diene elastomer by the intermediary of the free "X'" functions. It is, however, preferred to use the coupling agent in the free state (i.e. ungrafted) or grafted onto the inorganic reinforcing filler, in particular for reasons of better processing of the compositions in the uncured state.

Finally, an appropriate "coupling activator" may optionally be associated with the coupling agent, said coupling activator comprising a substance (a single compound single or combination of compounds) which, once mixed with this coupling agent, increases the effectiveness of the latter (see for example the above-mentioned applications WO00/5300 and WO00/5301).

I.4 Anti-Reversion Agent

According to the invention, the vulcanizable rubber composition comprises, as the anti-reversion agent, at least one thiouronium salt or an analogue of this salt satisfying the formula (I) below:

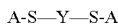  (I)

in which

A represents a group

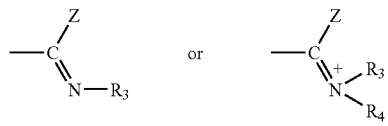

associated respectively with a molecule HX or an ion X—,

X denoting a halogen atom and

Z denoting

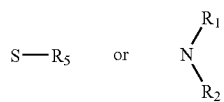

in which the radicals $R_1$, $R_2$, $R_3$, $R_4$ and $R_5$, which may be identical or different, denote a hydrogen atom or a linear or branched, monovalent hydrocarbon group selected from among $C_1$-$C_6$ alkyl, $C_2$-$C_8$ alkenyl, $C_5$-$C_8$ cycloalkyl, aryl or aralkyl groups, the alkyl radical being $C_1$-$C_6$, or alternatively $R_2$ and $R_3$ or $R_5$ and $R_3$ form with the nitrogen atoms to which they are linked an unsaturated heterocycle having from 3 to 5 carbon atoms, substituted or unsubstituted by one or more $C_1$-$C_6$ alkyl radicals, said heterocycle being conjugated or unconjugated with a benzene nucleus, and $R_1$ and $R_4$ denote hydrogen, $C_1$-$C_6$ alkyl, $C_2$-$C_8$ alkenyl;

Y represents a divalent hydrocarbon group selected from among an alkylene radical having 1 to 20 carbon atoms, a cycloalkylene radical having 6 to 24 carbon atoms, an arylene radical having 6 to 18 carbon atoms, an aralkylene radical having 7 to 25 carbon atoms, the alkylene radicals being linear or branched and optionally interrupted by one or more heteroatoms selected from among O and N.

According to one aspect of the invention, Y is a linear alkylene radical, more particularly an alkylene radical having 4 to 10 carbon atoms and still more particularly 6 carbon atoms.

The inventors have found that, among the compounds satisfying the formula (I) above, certain thiouronium salts and analogues make it possible to reduce still further the reversion rate of vulcanized rubber compositions. These are compounds of the formula (I) in which Z denotes

the substituents $R_1$, $R_2$, $R_3$ and $R_4$, which may be identical or different, denote a hydrogen atom or a linear or branched, monovalent hydrocarbon group selected from among $C_1$-$C_6$ alkyl, $C_2$-$C_8$ alkenyl, $C_5$-$C_8$ cycloalkyl, aryl or aralkyl groups, the alkyl radical being $C_1$-$C_6$, or alternatively $R_2$ and $R_3$ form with the nitrogen atoms to which they are linked an unsaturated heterocycle having from 3 to 5 carbon atoms, substituted or unsubstituted by one or more $C_1$-$C_6$ alkyl radicals, and $R_1$ and $R_4$ denote hydrogen, $C_1$-$C_6$ alkyl or $C_2$-$C_8$ alkenyl;

the group Y is as defined above.

Rubber compositions comprising such compounds constitute a preferred embodiment of the invention.

According to this embodiment, the thiouronium salts will more particularly be selected from among compounds of the formula (I) in which $R_1$, $R_2$, $R_3$ and $R_4$, which may be identical or different, denote a hydrogen atom or a group selected from among $C_1$-$C_6$ alkyl or $C_2$-$C_8$ alkenyl radicals.

According to another aspect of this embodiment, the thiouronium salt analogues will more particularly be selected from among compounds of the formula (I) in which $R_2$ and $R_3$ form with the two nitrogen atoms to which they are linked an unsaturated heterocycle having 3 to 5 carbon atoms which is not conjugated to a benzene nucleus, $R_1$ and $R_4$ being as defined above.

The thiouronium salts and analogues thereof according to the invention may be obtained by straightforward, conventional processes. By way of example, a thiourea of the formula:

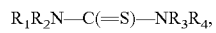

the substituents $R_1$, $R_2$, $R_3$ and $R_4$, which may be identical or different, denoting a hydrogen atom or a linear or branched, monovalent hydrocarbon group selected from among $C_1$-$C_6$ alkyl, $C_2$-$C_8$ alkenyl, $C_5$-$C_8$ cycloalkyl, aryl or aralkyl groups, the alkyl radical being $C_1$-$C_6$, may be reacted under reflux conditions with a compound of the formula X—Y—X, X and Y being as defined above, in a predetermined solvent for a predetermined period. The substitution reaction gives rise to the formation of a thiouronium salt of the formula (I) defined above.

The thiouronium salt analogues of the formula (I) according to the invention may be obtained in a similar manner.

Illustrative syntheses of these salts may be found in the scientific literature and in particular in Org. Syntheses, Coll. Vol.3, 362, 1954, Fieser & Fieser, Reagents for organic synthesis, Vol. 1, 1164, J. March, Advanced organic chemistry, reactions, mechanisms and structure, page 360, J. Heterocyclic Chem., 20, 813, 1983, or alternatively in the patent literature in particular FR 2 331 555, FR 1 538 328, U.S. Pat. Nos.4,214,096, 3,631,194.

The anti-reversion agent is present in the vulcanizable rubber composition according to the invention in proportions of from 0.1 to 10 phr, preferably from 0.5 to 5.0 phr.

I.5 Vulcanization System

The elastomer compositions according to the invention generally comprise a sulphur-based vulcanization system. The vulcanization system proper is preferably based on sulphur and a primary vulcanization accelerator, in particular an accelerator of the sulphenamide type. To this basic vulcanization system there are added, incorporated during the first non-productive phase and/or during the productive phase, various known secondary accelerators or vulcanization activators such as zinc oxide, stearic acid, guanidine derivatives (in particular diphenylguanidine), etc. The sulphur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr, in particular when the invention applies to a tire tread.

I.6 Miscellaneous Additives

Of course, the elastomer compositions according to the invention may also comprise all or some of the conventional additives used in rubber compositions intended for tire manufacture, such as, for example extender oils, plasticizers, protection agents such as anti-ozone waxes, chemical antiozonants, antioxidants, anti-fatigue agents, adhesion promoters, coupling activators, reinforcing resins, methylene acceptors and/or donors. If needs be, the silica may be also associated with a conventional white filler with little or no reinforcing action, for example particles of clay, bentonite, talcum, chalk, kaolin, which may be used, for example, in colored tire treads.

The elastomer compositions may also contain, in addition to the previously described coupling agents, covering agents for inorganic fillers, comprising for example only the Y' function, or more generally processing auxiliaries which are capable in known manner of making them easier to process in the uncured state, thanks to an improvement in the dispersion of the inorganic reinforcing filler in the rubber matrix and to a reduction in the viscosity of the compositions; these agents, used in a preferred amount of between 0.5 and 3.0 phr, are for example alkylalkoxysilanes, in particular alkyltriethoxysilanes, such as 1-octyl-triethoxysilane sold by Degussa-Hüls under the name Dynasylan Octeo or 1-hexa-decyl-triethoxysilane sold by Degussa-Hüls under the name Si216, polyols, polyethers (for example polyethylene glycols), primary, secondary, or tertiary amines (for example trialkanolamines), hydroxylated or hydrolyzable polyorganosiloxanes, for example α,dihydroxy-polyorganosiloxanes (in particular α,dihydroxy-polydimethylsiloxane).

I.7 Preparation of the Rubber Composition

The compositions are produced in suitable mixers, using two successive preparation phases familiar to the person skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at a lower temperature, typically below 110° C., for example between 60° C. and 100° C., during which finishing phase the cross-linking or vulcanization system is incorporated; such phases have been described for example in applications EP 501 227, EP 735 088, EP 810 258, EP 881 252, WO00/05300 or W00/05301.

By way of example, the first (non-productive) phase is performed in a single thermomechanical step during which all the necessary base constituents (diene elastomer, reinforcing filler and coupling agent if necessary) are introduced in a first phase into an appropriate mixer such as a conventional internal mixer, then in a second phase, for example after one to two minutes kneading, any possible additional covering agents or processing agents and various other additives, with the exception of the vulcanization system, are incorporated. When the apparent density of the inorganic reinforcing filler is low (which is generally the case for silicas), it may be advantageous to introduce it in two or more fractions.

A second stage of thermomechanical working may be added, in this internal mixer, after the mixture has dropped and after intermediate cooling (cooling temperature preferably less than 100° C.), with the aim of subjecting the compositions to an additional heat treatment, in particular in order to improve further the dispersion of the reinforcing filler and its coupling agent in the elastomer matrix. The total duration of the kneading, in this non-productive phase, is preferably between 2 and 10 minutes.

After cooling of the mixture thus obtained, the vulcanization system is then incorporated at low temperature, for example between 30° C. and 100° C., generally in an external mixer such as an open mill; the entire composition is then mixed (productive phase) for several minutes, for example between 5 and 15 minutes.

The manufacturing process according to the invention is characterized in that at least one thiouronium salt or an analogue of this salt, defined above, is introduced into the mixture during the first phase (non-productive phase) and/or during the second phase (productive phase). It will nevertheless be preferred to add the thiouronium salt or the analogue thereof during the second phase with the vulcanization system. In fact, adding the compound of the formula (I) during the productive phase makes it possible to improve reversion resistance still further.

The final composition thus obtained is then calendered, for example in the form of a film or a sheet, or alternatively extruded, for example in order to form a rubber profiled element used for manufacturing semi-finished products such as treads, crown plies, sidewalls, carcass reinforcement plies, beads, protectors, inner tubes or airtight internal rubbers for tubeless tires.

In summary, the process according to the invention for preparing a vulcanizable rubber composition, usable in particular for the manufacture of semi-finished products for tires, comprises the following steps:

at least one reinforcing filler is incorporated, in a mixer, into a diene elastomer;

this is all thermomechanically kneaded once or more until a maximum temperature of between 110° C. and 190° C. is reached;

the mixture is cooled;

a vulcanization system is then incorporated;

this is all kneaded up to a maximum temperature of less than 120° C., and is characterized in that at least one thiouronium salt or an analogue satisfying the formula (I) above is introduced into the composition in at least one of the steps a) and d).

Vulcanization (or curing) may then be performed in known manner at a temperature generally of between 130° C. and 200° C., preferably under pressure, for a sufficient time which may vary for example between 5 and 90 minutes depending in particular on the curing temperature, the vulcanization system used and the vulcanization kinetics of the composition under consideration.

The invention relates to the rubber compositions previously described, both in the "uncured" state (i.e. before curing) and in the "cured" or vulcanized state (i.e. after vulcanization).

The compositions according to the invention may be used alone or in a blend (i.e. in a mixture) with any other rubber composition, for example, for a tire application, with another composition usable for tire manufacture.

II. EXAMPLES OF EMBODIMENT

II1.1 Preparation of Various Salts According to the Invention

All operations are performed in an aerobic medium.

Synthesis of 16-bis(isothiouronium hydrobromide)hexane 1.52 g (0.02 mol) of thiourea and 1.6 ml (0.01 mol) of 1,6-dibromohexane and, as solvent, 25 ml of ethanol are introduced into a 100 ml three-necked flask fitted with a bulb condenser and magnetic stirrer bar and then the reaction medium is adjusted to reflux temperature. A clear, pale yellow reaction medium is obtained once the thiourea has solubilized.

After two hours' refluxing, a white solid appears which gains mass in the round-bottomed flask. Analytical monitoring of the reaction (HPLC for the thiourea and GPC for the 1,6-dibromohexane) reveals that the reactants have completely disappeared after approx. 24 hours.

The reaction medium is filtered while hot through a sintered filter. The solid is washed with ethanol before being placed in the vacuum oven for drying. 1,6-bis(isothiouronium hydrobromide)hexane, compound 1, is obtained.

Synthesis of 1,6-bis(N-substituted thiouronium hydrobromide)hexane and analogues The following two tables show the operating conditions used for each of the following thiouronium salts and analogues according to a preparation method similar to that for the synthesis of 1,6-bis(isothiouronium hydrobromide)hexane.

2. 1,6-bis(N-methyl thiouronium hydrobromide)hexane,
3. 1,6-bis(N-phenyl thiouronium hydrobromide)hexane,
4. 1,6-bis(N-allyl thiouronium hydrobromide)hexane,
5. 1,6-bis(N,N'dimethyl isothiouronium hydrobromide) hexane,
6. 1,6-bis(N,N'diphenyl isothiouronium hydrobromide) hexane,
7. 1,6-bis(N,N'-diethyl isothiouronium hydrobromide) hexane,
8. 1,6-bis(N,N'-di-n-butyl isothiouronium hydrobromide) hexane,
9. 1,6-bis(N,N'-tetramethyl isothiouronium bromide)hexane,
10. 2-{[6-(1,4,5,6-tetrahydropyrimidin-1-ium-2-ylthio) hexyl]thio}-1,4,5,6-tetrahydropyrimidin-1-ium dibromide,
11. 2-{[6-(1H-benzimidazol-2-ylthio)hexyl]thio}-1H-benzimidazole dihydrobromide,
12. 2-{[6-(1,3-benzothiazol-2-ylthio)hexyl]thio}-1,3-benzothiazole dihydrobromide.

| | Compounds | | | | | | |
|---|---|---|---|---|---|---|---|
| | 1 | 2 | 3 | 4 | 5 | 6 | 7 |
| Type of Thiourea | $H_2N$–C(=S)–$NH_2$ | $H_3C$–NH–C(=S)–$NH_2$ | Ph–NH–C(=S)–$NH_2$ | $H_2C$=CH–$CH_2$–NH–C(=S)–$NH_2$ | $H_3C$–NH–C(=S)–NH–$CH_3$ | Ph–NH–C(=S)–NH–Ph | Et–NH–C(=S)–NH–Et |
| Quantity of Thiourea | 0.02 mol = 2.08 g | 0.02 mol = 1.80 g | 0.02 mol = 3.04 g | 0.02 mol = 2.32 g | 0.02 mol = 2.85 g | 0.02 mol = 4.6 g | 0.02 mol = 2.65 g |
| Quantity of 1,6-dibromohexane | 0.01 mol = 1.6 mL | 0.01 mol = 1.6 mL | 0.01 mol = 1.6 mL | 0.01 mol = 1.6 Ml | 0.01 mol = 1.6 mL | 0.01 mol = 1.6 mL | 0.01 mol = 1.6 mL |
| Solvent 25 mL | Ethanol | Ethanol | Ethanol | Ethanol | Toluene | Chloroform | Toluene |
| | 24 h reflux | 48 h reflux | 60 h reflux | 72 h reflux | 48 h reflux | 5 days reflux | 48 h reflux |
| Treatment | filtration | evaporation | Filtration | filtration | filtration. | Evaporation | Evaporation |
| Mass obtained | 6.7 g | 4.27 g | 1.96 g | 4.63 g | 3.0 g | 6.5 g | 4.4 g |
| Yield | 85% (large quantity: quantitative) | 95% | 36% (large quantity: 97%) | quantitative | 70% (large quantity: quantitative) | 95% | 86% (large quantity: 97%) |

-continued

| | Compounds | | | | |
|---|---|---|---|---|---|
| | 8 | 9 | 10 | 11 | 12 |
| Type of thiourea or analogue (compounds 10, 11 and 12) | n-Bu—NH\\C(=S)/n-Bu—NH | H₃C—N(CH₃)\\C(=S)/H₃C—N(CH₃) | cyclic structure with N—C(SH)=N | benzimidazole-2-SH | benzothiazole-2-SH |
| Quantity of thiourea or analogue | 0.02 mol = 3.77 g | 0.02 mol = 2.64 g | 0.02 mol = 2.32 g | 0.02 mol = 3 g | 0.14 = 23.4 g |
| Quantity of 1,6-dibromohexane | 0.01 mol = 1.6 Ml | 0.01 mol = 1.6 mL | 0.01 mol = 1.6 mL | 0.01 mol = 1.6 mL | 0.07 mol = 10.8 mL |
| Solvent 25 mL | Ethanol | chloroform | Ethanol | Ethanol | Ethanol |
| Treatment | 60 h reflux grinding in acetone and filtration | 5 days reflux concentration | 5 days reflux concentration | 48 h reflux filtration | 5 days Filtration |
| Mass obtained | 3.84 g | 4.8 g | 4.84 g | 4.34 g | 15.5 g |
| Yield | 62% (large quantity: 90%) | quantitative | quantitative | 80% | 40% |

Compositions containing a thiouronium salt or an analogue illustrated previously as anti-reversion agent were prepared and these compositions were then tested.

III.2 Preparation of the Compositions

The compositions are prepared in the following manner: the diene elastomer (or the mixture of diene elastomers, if applicable), a reinforcing filler and, if applicable, the coupling agent, are introduced into a 400 cm3 "Banbury" type internal mixer with standard paddles, filled to 70%, the initial tank temperature of which is approximately 60° C., then, after 1 to 2 minutes of kneading, the various other ingredients, with the exception of the vulcanization system, are introduced. Thermomechanical working (non-productive phase) is then performed in one stage (total duration of kneading of about 7 minutes), until a maximum "dropping" temperature of about 150-170° C. is reached.

The resultant mixture is recovered, cooled and then the vulcanization system and anti-reversion agent according to the invention are added in an external mixer (homo-finisher) at 30° C., by mixing everything (productive phase) for 3 to 4 minutes in the open mill.

The compositions are subsequently calendered and then vulcanized.

III.3 Measurements and Tests Used

The rubber compositions are characterized before and after curing, as indicated below.

a. Mooney Plasticity

An oscillating consistometer such as described in standard AFNOR-NFT-43005 (November 1980) is used. Mooney plasticity is measured in accordance with the following principle: the raw composition (i.e. before curing) is molded in a cylindrical enclosure heated to 100° C. After one minute's preheating, the rotor turns within the test piece at 2 rpm, and the torque used for maintaining this movement is measured after 4 minutes' rotation. Mooney plasticity (ML1+4) is stated in "Mooney units" (MU, with 1 MU=0.83 N.m).

b. Tensile Tests

These tests make it possible to determine the elasticity stresses and the breaking properties. They are performed in accordance with standard AFNOR-NFT-46002, September 1988. The nominal secant moduli (in MPa) at 100% elongation (M100) and 300% elongation (M300) are measured on the second elongation (i.e. after one accommodation cycle). Breaking stresses (in MPa) and elongations at break (in %) are also measured. All these tensile measurements are effected under normal conditions of temperature and humidity in accordance with standard AFNOR-NFT-40101 (December 1979).

c. Measurement of Reversion

In order to simulate the thermal stresses to which the vulcanized rubber compositions are subjected during travel of the tire containing them, the optimum curing time for these compositions was increased at a given temperature so as to subject them to overcuring conditions.

The purpose of the reversion measurement is to ascertain indirectly the change in the number of sulphide bridges obtained after optimum curing and that obtained after a given time greater than the optimum curing time (overcuring or extended curing).

One way of determining reversion is to measure the change in the 100% deformation modulus or 300% deformation modulus after a very long curing time beyond optimum. It is, for example, possible to use the parameter % ΔM100 which corresponds to the change in the nominal secant modulus at 100% elongation between the measurement at optimum curing (at 150° C. or 180° C.) and after extended curing (4 h at 150° C. or 6 h at 180° C.) and which represents the reversion rate after 4 or 6 hours of extended curing at 150° C. or 180° C. respectively. It is, for example, possible to use the parameter %ΔM300 which corresponds to the change in the nominal secant modulus at 300% elongation between the measurement at optimum curing (at 150° C. or 180° C.) and after extended curing (4 h at 150° C. or 6 h at 180° C.) and which represents the reversion rate after 4 or 6 hours of extended curing at 150° C. or 180° C. respectively.

The higher are the %ΔM100 or %ΔM300 values, the more pronounced is the phenomenon of reversion.

III.4 Test Results

Compositions (C) formulated in Tables 1a to 1c are compared below, said compositions comprising according to the invention at least one thiouronium salt or an analogue as anti-reversion agent according to the invention, with control compositions (T) containing no anti-reversion agent.

a. First Series

A composition C1 according to the invention containing the thiouronium salt obtained from thiourea, namely compound 1, as the anti-reversion agent was tested.

The compositions tested satisfy the formulation of Table 1a, the contents of the various products being stated in phr, i.e. parts by weight per 100 parts by weight of elastomer.

Table 2a states the properties before and after optimum curing at 150° C. and after extended curing of 4 hours at 150° C. The thermal stability of the mixtures is measured by the change in the nominal secant modulus at 100% and 300% elongation between the measurement at optimum curing (at 150° C.) and after extended curing of 4 h (at 150° C.).

It emerges from these tests that the Mooney viscosity of composition C1 according to the invention remains substantially unchanged relative to the control composition T1.

Examination of the results in Table 2a also shows that the composition according to the invention, C1, compared with composition T1, allows the production of vulcanized rubber compositions with properties at optimum curing at 150° C. which are close to those of the control. The change in the nominal secant moduli at 100% and 300% elongation between optimum curing (at 150° C.) and extended curing (4 h at 150° C.) demonstrates the very good thermal stability of the mixture formulated with the thiouronium salt, superior to that of the control, which exhibits a large change in moduli.

Thanks to the incorporation of the thiouronium salt into a rubber compound, in the presence of sulphur and a vulcanization accelerator, it is therefore possible obtain vulcanized rubber compositions having very good thermal stability relative to a control formulated without anti-reversion agent.

Table 3a states the properties before and after optimum curing at 180° C. and after extended curing of 6 hours at 180° C. The thermal stability of the mixtures is measured by the change in the nominal secant modulus at 100% and 300% elongation between the measurement at optimum curing (at 150° C.) and after extended curing of 6 h (at 180° C.).

It will be noted that the composition according to the invention, C1, compared with composition T1, allows the production of vulcanized rubber compositions with properties at optimum curing, even at 180° C., which are close to those of the control. The change in the nominal secant moduli at 100% and 300% elongation between optimum curing (at 180° C.) and extended curing (6 h at 180° C.) demonstrates the very good thermal stability of the mixture formulated with the thiouronium salt, superior to that of the control, which exhibits a large change in moduli.

The results of these tests also demonstrate clearly that a significant reduction in reversion is obtained when, according to the invention, a thiouronium salt, specifically compound 1, is used as the anti-reversion agent in the vulcanizable diene rubber composition.

b. Second Series

Compositions according to the invention having an anti-reversion agent which is obtained from a disubstituted or tetrasubstituted thiourea, namely compounds 5, 7 and 9, were then tested.

The compositions C5, C6, C7 and C9 tested satisfy the formulation of Table 1b, the contents of the various products being stated in phr.

Examination of the results in Table 2b shows that compositions C5, C7 and C9 according to the invention, compared with the control composition T2, have in the uncured state an equivalent or greater but still satisfactory Mooney viscosity.

The change in the nominal secant moduli at 100% and 300% elongation between optimum curing (at 150° C.) and extended curing (4 h at 150° C.) demonstrates the very good thermal stability of the mixtures formulated with a thiouronium salt, superior to that of the control, which exhibits a large change in moduli.

These results clearly demonstrate that a significant reduction in reversion is obtained when, according to the invention, a thiouronium salt, specifically compounds 5, 7 or 9, is used as the anti-reversion agent in vulcanizable diene rubber compositions.

c. Third Series

A composition according to the invention having an anti-reversion agent obtained from an analogous compound to a thiouronium salt, namely compound 10. The composition tested C10 satisfies the formulation of Table 1c, the contents of the various products being stated in phr.

Examination of the results in Table 2c shows that composition C10 according to the invention exhibits in the uncured state a Mooney viscosity which is substantially unchanged compared with control composition T3.

It will also be noted that the composition according to the invention, C10, compared with composition T3, allows the production of a vulcanized rubber composition with properties at optimum curing at 150° C. close to those of the control. The change in the nominal secant moduli at 100% and 300% elongation between optimum curing (at 150° C.) and extended curing (4 h at 150° C.) demonstrates the very good thermal stability of the mixtures formulated with compound 10, superior to that of the control, which exhibits a large change in moduli.

These results also clearly demonstrate that a significant reduction in reversion is obtained when, according to the invention, a thiouronium salt analogue, specifically compound 10, is used as the anti-reversion agent in vulcanizable diene rubber compositions.

Thanks to the incorporation of a thiouronium salt or an analogue of such a salt into a rubber compound, in the presence of sulphur, it is therefore possible obtain vulcanized rubber compositions having an improved thermal stability relative to a control formulated without anti-reversion agent in that reversion is substantially reduced.

TABLE 1a

|  | Composition: | |
| --- | --- | --- |
|  | T1 | C1 |
| NR (1) | 100 | 100 |
| Carbon black (2) | 35 | 35 |
| ZnO (3) | 5 | 4 |
| Stearic acid (4) | 2 | 2 |
| Antioxidant (5) | 2 | 2 |
| Sulphur (6) | 1.6 | 1.6 |

TABLE 1a-continued

| Composition: | T1 | C1 |
|---|---|---|
| Compound 1 | — | 2 |
| CBS (7) | 0.6 | 0.6 |

(1) natural peptized rubber (mixture of sheets and SAR10);
(2) carbon black N375 from Cabot or from Columbian;
(3) Cachet Rouge zinc oxide or ZnO from Umicore;
(4) stearin (Pristerene 4931) from Uniqema;
(5) N-1,3-dimethylbutyl-N-phenyl-para-phenylenediamine, Santoflex 13 from Flexsys;
(6) mined sulphur from Siarkopol, petroleum sulphur from Cabrero or synthetic sulphur from Solvay;
(7) N-cyclohexyl-2-benzothiazole-sulphenamide or Santocure CBS from Flexsys.

TABLE 2a

| Composition: | T1 | C1 |
|---|---|---|
| Properties before curing: | | |
| Mooney (MU) | 61 | 64 |
| Properties after optimum curing at 150° C.: | | |
| M100 (MPa) | 1.53 | 1.77 |
| M300 (MPa) | 1.99 | 2.13 |
| Breaking stress (MPa) | 30.2 | 31.8 |
| Elongation at break (%) | 562 | 566 |
| Properties after extended curing, 4 hours at 150° C.: | | |
| M100 (MPa) | 1.13 | 1.69 |
| M300 (MPa) | 1.36 | 2.07 |
| % ΔM100 (%) | 26 | 4 |
| % ΔM300 (%) | 31 | 3 |

TABLE 3a

| Composition: | T1 | C1 |
|---|---|---|
| Properties after optimum curing at 180° C.: | | |
| M100 (MPa) | 1.18 | 1.54 |
| M300 (MPa) | 1.42 | 1.87 |
| Breaking stress (MPa) | 25.4 | 26.2 |
| Elongation at break (%) | 601 | 555 |
| Properties after extended curing, 6 hours at 180° C.: | | |
| M100 (MPa) | 0.85 | 1.34 |
| M300 (MPa) | 1 | 1.54 |
| % ΔM100 (%) | 29 | 12 |
| % ΔM300 (%) | 29 | 17 |

TABLE 1b

| Composition No. | T2 | C5 | C7 | C9 |
|---|---|---|---|---|
| NR (1) | 100 | 100 | 100 | 100 |
| Carbon black (2) | 35 | 35 | 35 | 35 |
| ZnO (3) | 5 | 5 | 5 | 4 |
| Stearic acid (4) | 2 | 2 | 2 | 2 |
| Antioxidant (5) | 2 | 2 | 2 | 2 |
| Sulphur (6) | 1.6 | 1.6 | 1.6 | 1.6 |
| Compound 5 (7) | — | 2.5 | — | — |
| Compound 7 (8) | — | — | 2.8 | — |
| Compound 9 (9) | — | — | — | 2.8 |
| CBS (10) | 0.6 | 0.6 | 0.6 | 0.6 |

(1) natural peptized rubber (mixture of sheets and SAR10);
(2) carbon black N375 from Cabot or from Columbian;
(3) Cachet Rouge zinc oxide or ZnO from Umicore;
(4) stearin (Pristerene 4931) from Uniqema;
(5) N-1,3-dimethylbutyl-N-phenyl-para-phenylenediamine, Santoflex 13 from Flexsys;
(6) mined sulphur from Siarkopol, petroleum sulphur from Cabrero or synthetic sulphur from Solvay;
(7) 1,6-bis(N,N'-dimethyl isothiouronium hydrobromide)hexane
(8) 1,6-bis(N,N'-diethyl isothiouronium hydrobromide)hexane
(9) 1,6-bis(N,N'-tetramethyl isothiouronium hydrobromide)hexane
(10) N-cyclohexyl-2-benzothiazole-sulphenamide or Santocure CBS from Flexsys.

TABLE 2b

| Composition No. | T2 | C5 | C7 | C9 |
|---|---|---|---|---|
| Properties before curing: | | | | |
| Mooney (MU) | 61 | 71 | 70 | 66 |
| Properties after optimum curine at 150° C.: | | | | |
| M100 (MPa) | 1.53 | 1.64 | 1.42 | 1.89 |
| M300 (MPa) | 1.99 | 1.95 | 1.71 | 2.39 |
| Breaking stress (MPa) | 30.2 | 31.4 | 27 | 32.6 |
| Elongation at break (%) | 562 | 582 | 568 | 554 |
| Properties after extended curing, 4 hours at 150° C.: | | | | |
| M100 (MPa) | 1.13 | 1.49 | 1.32 | 1.76 |
| M300 (MPa) | 1.36 | 1.74 | 1.53 | 2.25 |
| % ΔM100 (%) | 26.1 | 9 | 7 | 7 |
| % ΔM300 (%) | 31.6 | 10 | 10 | 6 |

TABLE 1c

| Composition No. | T3 | C10 |
|---|---|---|
| NR (1) | 100 | 100 |
| Carbon black (2) | 35 | 35 |
| ZnO (3) | 5 | 5 |
| Stearic acid (4) | 2 | 2 |
| Antioxidant (5) | 2 | 2 |
| Sulphur (6) | 1.6 | 1.6 |
| Compound 10 (7) | — | 2.9 |
| CBS (8) | 0.6 | 0.6 |

(1) natural peptized rubber (mixture of sheets and SAR10);
(2) carbon black N375 from Cabot or from Columbian;
(3) Cachet Rouge zinc oxide or ZnO from Umicore;
(4) (stearin (Pristerene 4931) from Uniqema;
(5) (N-1,3-dimethylbutyl-N-phenyl-para-phenylenediamine, Santoflex 13 from Flexsys;
(6) mined sulphur from Siarkopol, petroleum sulphur from Cabrero or synthetic sulphur from Solvay;
(7) 2-{[6-(1,4,5,6-tetrahydropyrimidin-1-ium-2-ylthio)hexyl]thio}-1,4,5,6-tetrahydropyrimidin-1-ium dibromide,
(8) N-cyclohexyl-2-benzothiazole-sulphenamide or Santocure CBS from Flexsys TABLE 2c

|  | Composition No. | |
| --- | --- | --- |
|  | T3 | C10 |
| Properties before curing: | | |
| Mooney (MU) | 57 | 63 |
| Properties after optimum curing at 150° C.: | | |
| M100 (MPa) | 1.53 | 1.87 |
| M300 (MPa) | 2.03 | 2.33 |
| Breaking stress (MPa) | 32 | 30 |
| Elongation at break (%) | 623 | 567 |
| Properties after extended curing, 4 hours at 150° C.: | | |
| M100 (MPa) | 1.10 | 1.74 |
| M300 (MPa) | 1.32 | 2.18 |
| % ΔM100 (%) | 27.8 | 7 |
| % ΔM300 (%) | 35 | 7 |

What is claimed is:

1. A rubber composition based on at least (i) a diene elastomer, (ii) a reinforcing filler and (iii) a thiouronium salt or an analogue of a thiouronium salt, wherein both the thiouronium salt and the analogue of a thiouronium salt satisfy the formula (I) below:

$$A\text{-}S\text{—}Y\text{—}S\text{-}A \qquad (I)$$

in which,

A represents a group

associated respectively with a molecule HX or an ion X;
X denotes a halogen atom, and
Z denotes

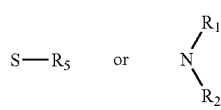

in which the radicals $R_1$, $R_2$, $R_3$, $R_4$ and $R_5$, which may be identical or different, denote a hydrogen atom or a linear or branched, monovalent hydrocarbon group selected from the group consisting of $C_1$-$C_6$ alkyl, $C_2$-$C_8$ alkenyl, $C_5$-$C_8$ cycloalkyl, aryl and aralkyl groups, the alkyl radical of the aralkyl group being $C_1$-$C_6$, or alternatively $R_2$ and $R_3$ or $R_5$ and $R_3$ form with the nitrogen atoms to which they are linked an unsaturated heterocycle having from 3 to 5 carbon atoms, substituted or unsubstituted by one or more $C_1$-$C_6$ alkyl radicals, said heterocycle being conjugated or unconjugated with a benzene nucleus, and $R_1$ and $R_4$ denote hydrogen, $C_1$-$C_6$ alkyl or $C_2$-$C_8$ alkenyl;

Y represents a divalent hydrocarbon group selected from the group consisting of an alkylene radical having 1 to 20 carbon atoms, a cycloalkylene radical having 6 to 24 carbon atoms, an arylene radical having 6 to 18 carbon atoms and an aralkylene radical having 7 to 25 carbon atoms, the alkylene radicals being linear or branched optionally interrupted by one or more heteroatoms selected from the group consisting of O and N.

2. A rubber composition according to claim 1, wherein the thiouronium salt or analogue of a thiouronium salt is a compound of the formula (I) in which Y denotes a linear alkylene radical.

3. A rubber composition according to claim 2, wherein Y denotes a linear $C_4$-$C_{10}$ alkylene radical.

4. A rubber composition according to claim 1, wherein the thiouronium salt or analogue of a thiouronium salt is a compound of the formula (I) in which, Z represents the group

substituents $R_1$, $R_2$, $R_3$ and $R_4$, which may be identical or different, denote a hydrogen atom or a linear or branched, monovalent hydrocarbon group selected from the group consisting of $C_1$-$C_6$ alkyl, $C_2$-$C_8$ alkenyl, $C_5$-$C_8$ cycloalkyl, aryl and aralkyl groups, the alkyl radical of the aralkyl group being $C_1$-$C_6$, or alternatively $R_2$ and $R_3$ form with the nitrogen atoms to which they are linked an unsaturated heterocycle having from 3 to 5 carbon atoms, substituted or unsubstituted by one or more $C_1$-$C_6$ alkyl radicals, and $R_1$ and $R_4$ denote hydrogen, $C_1$-$C_6$ alkyl or $C_2$-$C_8$ alkenyl.

5. A rubber composition according to claim 4, wherein the thiouronium salt is a compound of the formula (I) in which $R_1$, $R_2$, $R_3$ and $R_4$, which may be identical or different, denote a hydrogen atom, or a group selected from the group consisting of $C_1$-$C_6$ alkyl and $C_2$-$C_8$ alkenyl radicals.

6. A rubber composition according to claim 4, wherein the analogue of a thiouronium salt is a compound of the formula (I) in which the $R_2$ and $R_3$ radicals form with the nitrogen atoms to which they are linked an unsaturated heterocycle having from 3 to 5 carbon atoms which is unconjugated with an aromatic nucleus.

7. A rubber composition according to claim 1, which comprises from 0.1 to 10 phr of at least one compound of formula (I).

8. A rubber composition according to claim 7, which comprises from 0.5 to 5.0 phr of at least one compound of formula (I).

9. A rubber composition according to claim 1, wherein the reinforcing filler (ii) comprises at least in part an inorganic filler associated with a coupling agent providing a bond between said inorganic filler and the elastomer (i).

10. A rubber composition according to claim 1, wherein the diene elastomer comprises at least in part at least one isoprene elastomer.

11. A rubber composition according to claim 10, wherein the isoprene elastomer is a natural rubber.

12. A rubber article based on a rubber composition according to claim 1.

13. A semi-finished rubber article for tires based on a rubber composition according to claim 1.

14. A tire incorporating a semi-finished rubber article as defined in claim 13.

15. A process for the preparation of a vulcanizable rubber composition comprising the following steps:
- a) incorporating at least one reinforcing filler and at least one elastomer into a mixer;
- b) thermomechanically kneading the filler and elastomer until a maximum temperature of between about 110° C. and 190° C. is reached,
- c) cooling the mixture,
- d) adding a sulphur-based vulcanization system to the mixture, and
- e) kneading to a maximum temperature of less than about 120° C., wherein at least one thiouronium salt or analogue of a thiouronium salt satisfying the formula (I) as defined in claim 1 is incorporated in at least one of steps a) and d).

16. A process according to claim 15, wherein the thiouronium salt or analogue thereof is incorporated in step d).

17. A process according to claim 15, wherein from 0.1 to 10 phr of thiouronium salt or analogue thereof is incorporated.

18. A process according to claim 17, wherein from 0.5 to 5.0 phr of thiouronium salt or analogue thereof is incorporated.

19. A process for reducing the reversion rate of a vulcanized rubber composition, which comprises incorporating by kneading at least one thiouronium salt or an analogue of a thiouronium salt as defined in claim 1 into the rubber composition in the uncured state.

20. A process according to claim 19, wherein the thiouronium salt or analogue of a thiouronium salt is incorporated during the productive phase of the process for preparing the vulcanizable rubber composition.

* * * * *